J. U. BARR.
LAMP.
APPLICATION FILED OCT. 9, 1912.

1,101,829.

Patented June 30, 1914.

Witnesses:

Inventor:
John U. Barr,
by Warren Wright
attorney.

UNITED STATES PATENT OFFICE.

JOHN U. BARR, OF NEW YORK, N. Y.

LAMP.

1,101,829.  Specification of Letters Patent.  Patented June 30, 1914.

Application filed October 9, 1912. Serial No. 724,732.

*To all whom it may concern:*

Be it known that I, JOHN U. BARR, a citizen of the United States, residing at New York city, in the county and State of New York, have invented certain new and useful Improvements in Lamps, of which the following is a clear, full, and exact description.

The object of this invention is to provide a new and improved head light for automobiles and other uses, where a very strong light is to be used, and where the major portion of the light finds its greatest use for reflection over a portion of the space in front of the lamp.

A particular use to which my invention is applicable is automobile head lights, where a strong light is reflected through a glass front to the lamp, and where the useful rays of light for the party driving car are upon the ground in front of the machine.

My invention partially obstructs the strong reflected light through the upper portion of the glass front of a lamp, when used for automobile work, so that an approaching driver will not be dazzled by the light, but the driver of the car provided with a lamp of my invention will have the same amount of light on his road that he is to travel.

In carrying out my invention in the preferred embodiment thereof, I provide a lamp casing having any desirable source of light therein with a glass front, having one clear portion and another portion either opaque or semi-transparent, and preferably the clear and semi-transparent portions each covers substantially half of the glass, the semi-transparent portion preferably having a depending tab which comes into direct line with the center rays of the reflected light from the casing. In this preferred embodiment I place for advertising purposes opaque or contrasting letters on the semi-transparent or opaque portion of the glass front.

The scope of my invention will be pointed out in the claim.

Figure 1:
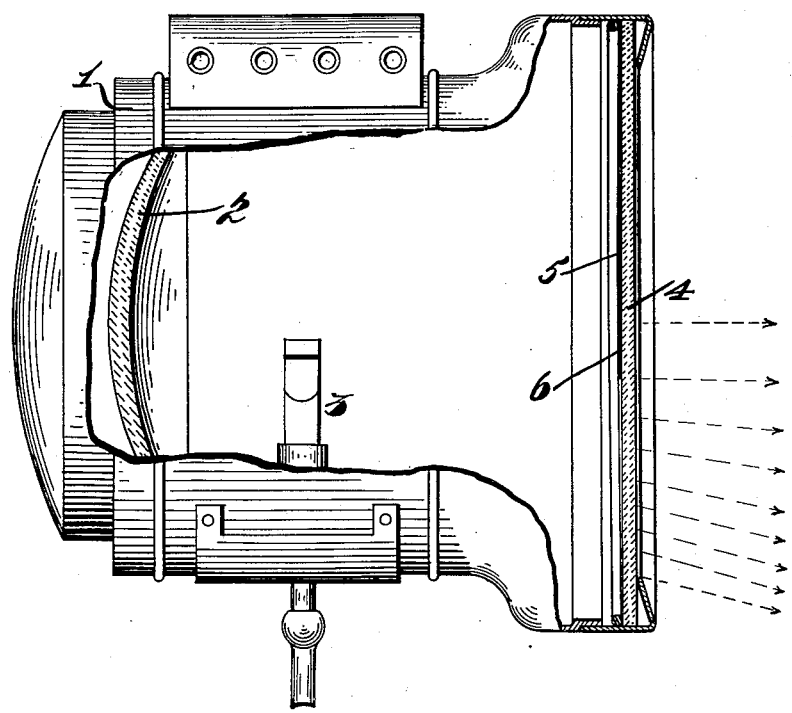
Figure 2:
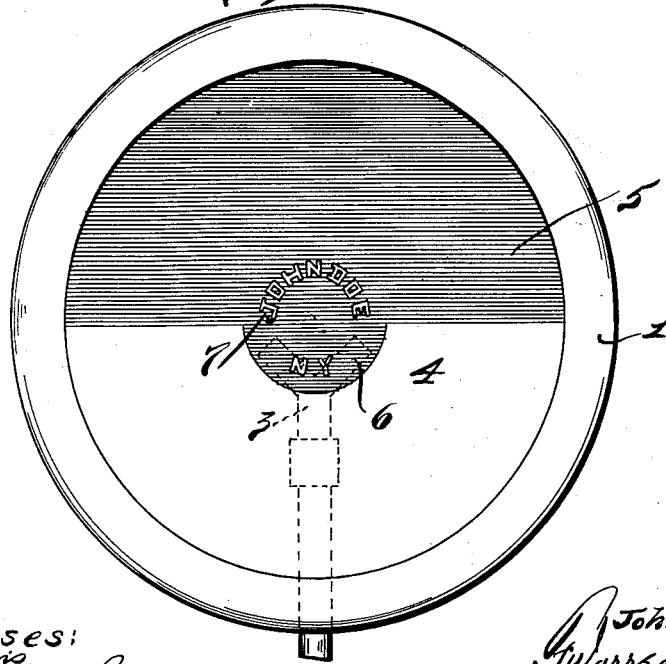

In the accompanying drawings, Figure 1 is a side elevation partly broken away of my improved lamp. Fig. 2 is a face view of the lamp.

As shown in Fig. 1, the lamp casing 1 is provided with the usual reflector 2, and a source of light 3, which may be any source desired. It is shown as a gas burner in the drawings. At the front of the casing I mount a glass plate 4 provided with a portion 5 located above the horizontal center line of the reflector, which projects the light forward. This portion 5 is either opaque or semi-transparent to cloud or diminish the strength of the rays projected through the lens. The part 5 is preferably composed of colored matter on the glass itself, such as a stain. I prefer to affix a projection of opaque or semi-transparent material around the center portion of the globe, or that portion through which the center line of reflected light will pass to obscure such portion, and upon such portion preferably I provide advertising lettering such as 7. Where the part 5 and projection 6 are opaque, the lettering is preferably transparent or semi-transparent. Where the portion 5 and tab 6 are semi-transparent, the lettering is preferably opaque, so as to make a contract to produce an artistic and pleasing effect to the eye.

The obscure portion of the plate may be formed by providing varnish or baking coloring matter on to the glass, or in any other well known manner of producing a stained glass, or by placing an opaque plate next to or over the glass.

I claim as my invention:—

The herein described lamp consisting of a casing, a source of light therein, a glass plate in the front, a light obscuring means for said plate obscuring the passage of light through the upper half thereof and extending into the lower half to include a tab depending from substantially the center of the glass plate so as to intercept the central rays of reflected light and obscuring the same.

Signed at New York city, New York, this 8th day of October, 1912.

JOHN U. BARR.

Witnesses:
 ALBERT H. T. BANZHAF,
 F. WARREN WRIGHT.